United States Patent [19]

Goheen et al.

[11] 4,016,353

[45] * Apr. 5, 1977

[54] PROCESS FOR PRODUCING ORGANIC ACID ESTERS OF CELLULOSE

[75] Inventors: David W. Goheen, Camas; Michael D. Fahey, Vancouver; Harvey L. Claussen, Seattle, all of Wash.

[73] Assignee: Crown Zellerbach Corporation, San Francisco, Calif.

[ * ] Notice: The portion of the term of this patent subsequent to Oct. 28, 1992, has been disclaimed.

[22] Filed: Apr. 14, 1975

[21] Appl. No.: 567,580

[52] U.S. Cl. .................................. 536/69; 536/58
[51] Int. Cl.² .................. C08B 3/06; C08B 3/20
[58] Field of Search .............. 260/227, 214, 229; 536/58, 69

[56] References Cited

UNITED STATES PATENTS

| | | | |
|---|---|---|---|
| 1,566,398 | 12/1925 | Grillet | 260/227 |
| 1,956,832 | 5/1934 | Mason | 260/227 |
| 2,119,117 | 5/1938 | Schuller et al. | 260/229 |
| 2,778,820 | 1/1957 | Clevy et al. | 260/229 |
| 2,854,445 | 9/1958 | Clevy et al. | 260/214 |
| 2,854,446 | 9/1958 | Robin et al. | 260/229 |
| 3,037,902 | 6/1962 | Fahey et al. | 260/227 |
| 3,403,145 | 9/1968 | Edge et al. | 260/227 |
| 3,506,644 | 4/1970 | Parker | 260/232 |
| 3,525,734 | 8/1970 | Rajon | 260/227 |
| 3,915,959 | 10/1975 | Goheen et al. | 260/231 CM |

FOREIGN PATENTS OR APPLICATIONS

| | | | |
|---|---|---|---|
| 303,485 | 5/1929 | United Kingdom | 260/227 |
| 604,864 | 7/1948 | United Kingdom | 260/212 |

OTHER PUBLICATIONS

Chemical Abstracts, vol. 42, No. 14, July 20, 1948, p. 5225d.
Chemical Abstracts, vol. 81, No. 6, Aug. 12, 1974, p. 27451g.

*Primary Examiner*—Ronald W. Griffin
*Attorney, Agent, or Firm*—Jerome S. Marger; Corwin R. Horton

[57] ABSTRACT

A process for producing organic acid esters of cellulose, in an efficient and rapid manner, which includes confricating cellulose in the presence of esterification chemicals, the confrication step providing the major driving force in conducting the esterification reaction.

23 Claims, 1 Drawing Figure

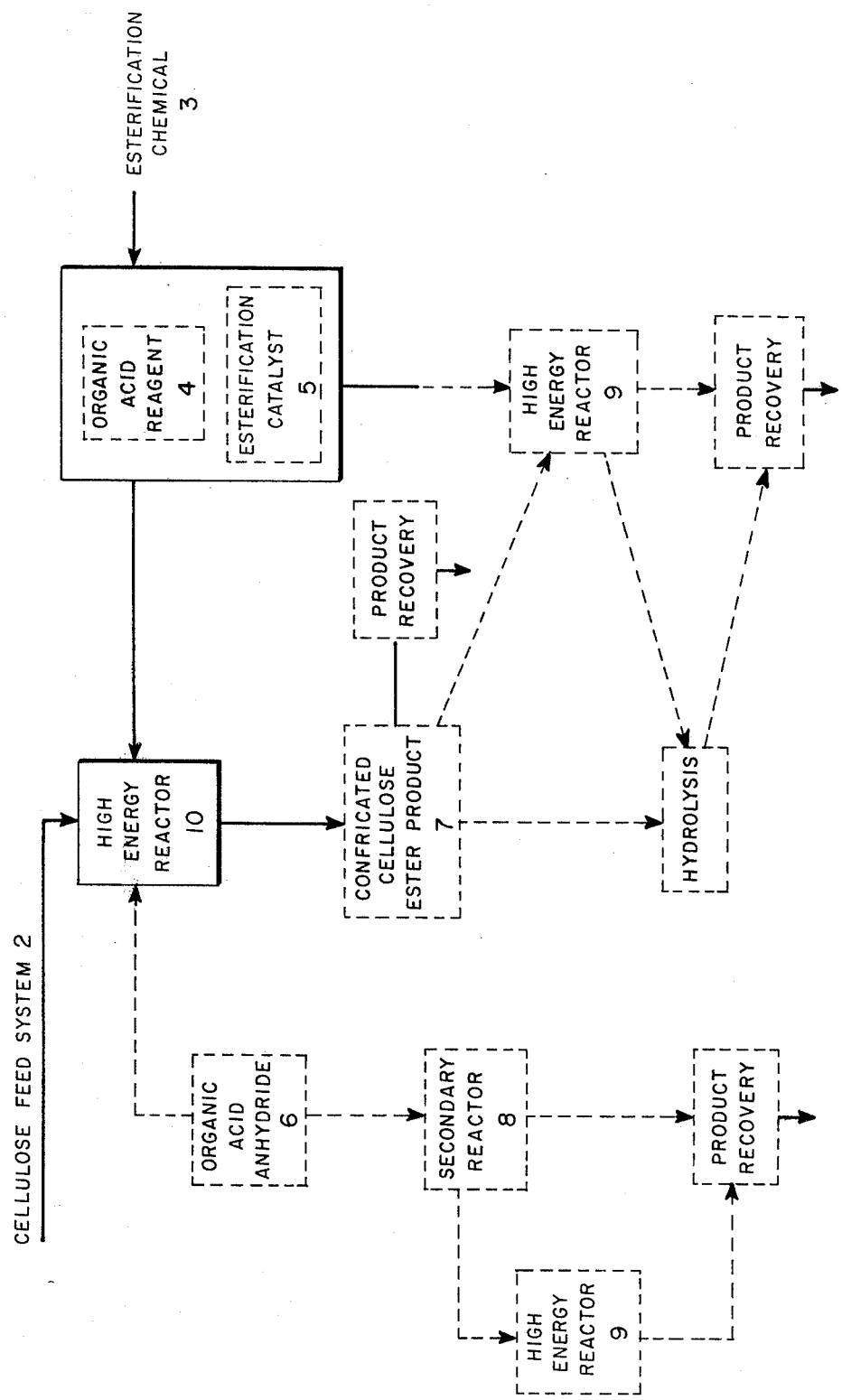

PROCESS FOR PRODUCING ORGANIC ACID ESTERS OF CELLULOSE

BACKGROUND OF THE INVENTION

As stated in the Encyclopedia of Polymer Science and Technology, Volume 3, page 325 (1972), "Cellulose is a polyhydroxy compound and is therefore capable of reacting with such reagents as organic acids, anhydrides, and acid chlorides to form organic esters. Theoretically, (cellulose) esters of almost any organic acid can be prepared, . . . " For example, cellulose acetate, the most important commercial cellulose ester, has been conventionally prepared by treatment of cellulose pulps in batch-wise operations with acetic acid and acetic anhydride, catalyzed by a mineral acid such as sulfuric acid.

A detailed history of organic cellulose esters is provided on pages 325–354 of the above identified Polymer Encyclopedia volume.

Furthermore, Volume 4 of Kirk Othmer Encyclopedia of Chemical Technology, pages 632 to 637 (1970), sets forth additional background material on cellulose acetate, cellulose acetate propionate, and cellulose acetate butyrate, respectively.

The respective cellulose and cellulose triacetate molecules are pictured on page 329 of the previously described Polymer Encyclopedia article. In order to prepare a cellulose acetate for use in its main application, i.e., fibers for the textile industry, a product having an acetyl content of from about 37 to about 41% must be prepared. Another way of characterizing the cellulose acetate product is by using the term "degree of substitution" (DS). The degree of substitution (DS) is defined as the average number of hydroxyl groups substituted, of the three hydroxyl groups available for substitution in the anhydro glucose units. For example, so-called cellulose triacetate has an acetyl content of 43.5% and a degree of substitution of about 2.8–3.0.

Two types of acetylation reactions have been suggested for preparing cellulose esters. The first is homogeneous or fibrous esterification. In the homogeneous process, which is by far the major means by which cellulose acetate is produced commercially, an excess of acetic acid and acetic anhydride are employed to form cellulose triacetate having a DS of at least 2.8. The cellulose triacetate produced is in solution in the form of a dope, i.e., a viscous, usually clear, cellulose acetate solution, preferably free of fibers. In order to prepare the desired cellulose ester product having the requisite lower degree of substitution, the cellulose triacetate dope is hydrolyzed by increasing the water content by about 5 to 10%.

As described on pages 337–341 of the Encyclopedia of Polymer Science and Technology article cited above, the major commercial process for the preparation of cellulose acetate is the solution or homogeneous acetylation process. The most commonly used catalyst in this process is, of course, sulfuric acid. The Encyclopedia article goes on to state that the esterification reaction to produce the triester contemplates adding cellulose and acetic acid to an acetylation mixture where, after the cellulose has been swollen and activated, a small portion of the sulfuric acid catalyst is added to initiate cleavage of the cellulose chain. At this point, the mixture is cooled and cold acetic anhydride is added thereto, thus causing any water in the system to be reacted by the acetylation mechanism. The mixture is then further cooled and the acetylation reaction initiated by adding the remainder of the sulfuric acid catalyst. The reaction temperature is regulated to gradually increase to 90°–95° F. during an interval of about 1.5 to 2 hours to produce the aforementioned cellulose triester dope. A 60 to 75% mixture of acetic acid and water is then added to terminate the acetylation reaction at the requisite viscosity by destroying the excess anhydride present in the system. This termination step may require about an hour to complete. If the triester is a desired product, the catalyst is then neutralized and removed. If, however, the hydrolyzed lower D.S. product is desired, such as secondary cellulose acetate, the sulfuric acid concentration is generally reduced to the desired level for conducting the reaction, the temperature is adjusted, and the batch is transferred to an hydrolysis vessel where the cellulose solution is allowed to hydrolyze at constant temperature until desired acetyl value, as previously discussed, is reached. The cellulose acetate is then recovered by various known techniques.

On page 340 of the Encyclopedia of Polymer Science and Technology description, a more detailed discussion of the intricacies of acetylation is provided. More specifically, in the previously described conventional cellulose acetate process, the acetic acid is employed as a solvent for the cellulose triester during the reaction, the acetic anhydride being the esterifying agent and, at the same time, reacting with any water formed during the esterification process. Critical to the formation of a uniform cellulose acetate product is a uniform distribution of the sulfuric acid catalyst with respect to the cellulose molecule. However, since the sulfation reaction between the cellulose and the sulfuric acid is much faster than the acetylation reaction, the sulfuric acid combines completely, but not necessary uniformly, with the cellulose immediately after the addition of the acetic anhydride. Therefore, control of the kinetics of both the sulfation and subsequent acetylation reactions, respectively, to produce a uniform cellulose triester product is difficult, at best. Accordingly, the prior art has provided means for chemically driving and controling the sulfation and acetylation reaction kinetics. In the aforementioned conventional cellulose acetate formation process, for example, acetic anhydride acts as the driving force for chemically controling the kinetics of the respective sulfation and acetylation reactions. This is accomplished by the use of an excessive amount of expensive acetic anhydride to form the cellulose triacetate product while meticulously controling the reaction parameters over an inordinately long time period. By employing this tedious, step-wise method, i.e., activation of the cellulose molecule with sulfuric acid followed by acetylation employing acetic anhydride, the requisite uniform cellulose triester dope will, hopefully, be produced. As stated on lines 14–16 on page 340, of the Polymer Encyclopedia article, "Proper correlation of the initial speed of reaction, maximum temperature, and total time of esterification are important in production control and in obtaining a fiber-free clear solution of cellulose triacetate in acetic acid."

The above peculiarities of the cellulose acetylation reaction are said to be due to several factors. First, all of the cellulose hydroxyl groups may not be available for reaction because crystallinity or insolubility of the cellulose hinders access of the reagent to the hydroxyl groups. Second, excessive amounts of degradive side reactions must cause cleavage of the cellulose chains resulting in undesirable, nonuniform products having unsatisfactory physical and chemical properties. In the past, the degradation reactions have been controled by lowering the temperature and allowing the acetylation reaction to continue for long periods of time. Third, the rates of esterification of the primary hydroxyl groups of the cellulose molecule, as compared with the secondary hydroxyl groups, are different. As shown by C. J. Malm et al. in the Journal of the American Chemical Society, Volume 75, pages 80–84 (1953), the uncatalyzed reactions of cellulose with acetic anhydride indicate that primary hydroxy groups reacted ten times as fast as the secondary. Furthermore, when the reactions were catalyzed with sulfuric acid, the primary hydroxyl groups reacted two and one-half times as fast. This is a further important reason as to why the cellulose acetate formation reaction cannot be readily controled.

The proposed heterogeneous formation of cellulose acetate is accomplished topichemically without dissolving the cellulose fibers. Furthermore, a product having an optimum degree of substitution for acetone solubility (2.2–2.6) can theoretically be produced by this process in a direct manner, without going to the cellulose triester, thereby further reducing the need for employment of large, excess amounts of acetic acid and acetic anhydride. Until now, however, an economical process for producing uniformly substituted, heterogeneous cellulose esters, preferably in a direct manner, has not been commercially successful.

Thus, cellulose acetate, as well as other higher acid esters, are still, for the most part, produced in batchwise operations requiring considerable time, using relatively large amounts of excess anhydride. Thus, the above standard conventional procedure, as well as requiring a high capital investment owing to the need for extensive equipment to maintain the cellulose and reactants during the tedious formation process, also requires a high material cost owing to the necessity for using excessive amount of expensive organic anhydrides.

Various patents describe complex processes for making organic acid esters of cellulose. For example, U.S. Pat. No. 2,966,485 to Laughlin et al. relates to the production of cellulose esters employing a series of at least four successive reaction zones in an attempt to form uniform homogeneous product. In British Pat. Nos. 740,171 and 802,863 to Societe Rhodiaceta, tubular esterification zones and provided for conducting the requisite esterification reaction. In U.S. Pat. No. 2,778,820 to Clevy et al. and U.S. Pat. No. 2,854,446 to Robin et al., cellulose fibers, which have been previously beaten at low consistency, are employed as the cellulose feed stream for subsequent cellulose ester formation. Other patents, such as U.S. Pat. No. 3,525,734 to Rajon, describe complex processes for acetylation and/or hydrolysis in producing cellulose acetate including modified catalyst systems, the addition of stabilizers, or by providing other additional steps to an already lengthy formation procedure. Other systems, such as described in U.S. Pat. No. 3,273,807 to Wright, provide a process for premixing conditioning fluid, such as acetic acid, with cellulose fiber solids to facilitate the production of fluffed pulp, the respective fibers being individually coated with conditioning fluid. In this case, a refiner is used to perform the premixing function.

SUMMARY OF THE INVENTION

The present invention relates to an esterification process employed in the rapid and efficient production of organic acid esters of cellulose, which includes employing a confrication step as the pedominant means for providing penetration of the esterification chemicals throughout the cellulose in a uniformly distributed and controled manner, without unwanted degradation of the confricated product formed.

"Confrication" is defined, for purposes of this invention, as high energy, frictional interaction of a cellulose-containing reaction system, including cellulose fibers and all or part of the chemicals required for esterification, the cellulose fibers and esterification chemicals being maintained in intimate contact with each other. More specifically, the chemicals which are employed with the cellulose for confrication in a high energy reactor include an organic reagent and an esterification catalyst. The confrication step can be conducted in the absence of an organic acid anhydride reactant. Moreover, all or part of the anhydride reaction can be provided during the confrication step and/or at a subsequent point in the reaction sequence.

By employing the above confrication step, the esterification chemicals, and, if present, the organic acid anhydride, rapidly and substantially completely penetrate and are uniformly distributed throughout, the cellulose fiber structure without unwanted degradation thereof. In contradistinction, the prior art processes provide for topichemical treatment of the cellulose by mixing, wetting, or conditioning. In these topichemical treatments, esterification is slowly advanced chemically from layer-to-layer throughout the cellulose structure as opposed to the rapid, uniform penetration which occurs when the confrication step of the present invention is employed. Thus, prior art processes, by their nature, are inefficient, cumbersome, and difficult to control. Furthermore, in order to attain the requisite uniformity commercially required of the subject cellulose esters, such as cellulose acetate, cellulose diacetate, and cellulose triacetate, the prior art esterification reactions must be closely monitored with respect to temperature during the entire formation procedure, excessive amounts of anhydride and extensively long periods of time being a prerequisite to forming the desired product.

Quite unexpectedly, when the process of the present invention is employed, the requisite organic acid esters of cellulose can be rapidly and continuously formed, the need to harness the subject exothermic esterification in order to maintain uniformity and control degradation and molecular weight of the reaction product being subjected diminished by employing the subject controled esterification. More specifically, when the process of this invention is employed, the above described confrication step can be conducted either at atmospheric or superatmospheric reaction conditions, respectively, and at ambient or elevated temperatures. In any case, this is totally contrary to the prior art teachings, wherein meticulous regulation of the entire esterification reaction is mandatory if commercial cellulose esters are to be produced.

Thus, while the aforementioned conventional prior art process requires temperature to be maintained at less than about 95° F., during the course of the entire reaction, in order to produce a cellulose ester product having the required physical and chemical properties, temperatures up to about the boiling point of the organic reagent, at atmospheric pressure, and above the boiling point of the organic reagent at corresponding superatmospheric pressures, can be employed in the subject process. It is further provided herein that the subject controled esterification can be completed in a period of at least about 0.5 hour, and preferably in at least about 0.25 hour, and more preferably in a period of at least about 0.1 hour, each of the above time periods being measured from the point at which the cellulosecontaining reaction system, in the absence or in the presence of an organic acid anhydride, is subject to the subject confrication.

A reduction in the D.S. of the cellulose ester product is required, after completion of the subject esterification, the esterified cellulosic product formed is then subjected to hydrolysis, using conventional techniques known in the prior art, thereby producing the requisite organic acid esters of cellulose by removing some of the acyl groups formed during the above esterification formation.

In any event, the overall amount of organic acid anhydride reactant can in many instances be significantly reduced to a level well below that which is required for conventional cellulose ester formation. Alternatively, the anhydride can be substantially eliminated from the reaction scheme. However, in this latter case, the cellulose esters produced have a much broader D.S. range as compared to the above conventional materials, significantly lower D.S. values being encompassed thereby.

BRIEF DESCRIPTION OF THE DRAWING

FIG. 1 is a schematic view in block form of a process flow diagram illustrating the formation of organic acid esters of cellulose according to the present invention.

DETAILED DESCRIPTION OF THE INVENTION

Referring now to FIG. 1, a cellulose feed system 2 is employed, at high consistency, and is comprised of cellulose fibers and water. Suitable materials from which the cellulose can be derived for use herein include the usual species of coniferous pulp wood such as spruce, hemlock, fir, pine, and the like; deciduous pulp wood such as popular, birch, cottonwood, alder, etc,; and fibrous plants used in papermaking exemplified by cereal straws, corn stalks, bagasse, grasses, and the like.

Individual fibers are separated from the lignin lamella, i.e., the adhesive-like substance which binds the fibers together and surrounds the multiple layers of the cellulose in its natural state, by conventional means, such as chemical pulping. The above feed should preferably be cellulosic pulp of at least 90 GE brightness points, having a preferred alpha-cellulose content of at least 85%, and more preferably of at least 90%. Conventional processes require a 92 –96% alpha-cellulose range.

"Consistency," as used herein, refers to the percent by weight on a dry basis of the fibers in the food. Cellulose feed, which is normally prepared as an aqueous mixture, is dewatered and reduced to a high consistency so that the respective fiber surfaces are in intimate contact. Consistencies ranging from surfaces are in intimate contact. Consistencies ranging from about 10 to 60%, and preferably from about 15 to 35%, are advantageously employed.

Since high consistency cellulosic fibers, in the usual instance, are in a semifluid state, they are generally considered nonpumpable. Therefore, a device capable of transporting a relatively immobile mixture, such as a screw conveyor, or other like means, can be used to charge the high consistency cellulose to high energy reactor 10.

Reactor 10 can be any device capable of confricating cellulose feed system 2 and esterification chemicals 3 to produce a confricated, organic acid ester of cellulose 7. As previously discussed, this step furnishes the predominant means for producing chemical penetration of the esterification chemicals 3, and, if present, organic acid anhydride reactant 6, throughout the cellulose feed fibers in a substantially complete, uniformly distributed and controled manner, without unwanted degradation of the confricated product formed. For example, cellulose feed system 2 can be introduced into an area formed within high energy reactor 10, the area including means for confricating feed system 2 and esterification chemicals 3, respectively. More specifically, the confricating means can, for example, comprise a pair of opposed surfaces forming a work space therebetween, the opposed surfaces being capable of providing the requisite amount of confricating energy to the cellulose feed system 2 and esterification chemicals 3 passing within the work space. This provides substantial penetration and uniform distribution of the esterification chemicals throughout the cellulose fibers. Typically, a single- or double-revolving disc refiner is employed as a high energy reactor 10. A double-disc refiner, for instance, can be the same refiner, in principle, as the one disclosed in U.S. Pat. Nos. 2,214,704 and 2,568,783, respectively. Operation of a refiner such as the Bauer 415, in the mechanical sense, is more specifically described in the aforementioned patents and in Example 1 of this application. In a similar manner, confricated product 7, or the product from secondary reactor 8, can be provided to high energy reactor 9 for further confrication. This latter confrication step can be conducted in the absence or presence of additional amounts of esterification chemicals.

Confricated product 7 can be directly recovered or hydrolyzed employing conventional techniques or, as will be hereinafter described, can be further reacted with an organic acid anhydride in secondary reactor 8, or can be further confricated in high energy reactor 9.

The amount of energy imparted to the high consistency cellulose system 2 must be of sufficient magnitude to provide confrication. The power input and feed rates of the cellulose can therefore be controled, depending on the type and quality of the cellulose fibers, so that a given amount of energy can be imparted to the fibers. For instance, about 8 horsepower days per ton of air-dried pulp (HPD/T), the daily horsepower required to produce one tone of pulp per pass through the high energy reactor(s), and preferably about 15 HPD/T, and an upper energy level of about 40 HPD/T, and preferably 25 HPD/T, can be exemplarily employed.

In producing the subject organic acid ester, esterification chemicals 3 are added to high energy reactor 10 along with the cellulose feed system 2. Typically, esterification chemicals 3 comprise an organic acid reagent 4 and esterification catalyst 5. Regarding the organic acid reagent 4, lower alkyl organic acids, either individually or combinations thereof, such as propionic acid, butyric acid, and acetic acid, are most often employed since higher alkyl organic acid reagents generally react too slowly. Acetic acid is preferred, however, for use herein. Esterification catalyst 5 can also be added to high energy reactor 10 as a component of esterification chemicals 3. Although other catalysts have been proposed, a mineral acid catalyst, and more particularly sulfuric acid, has attained the most widespread use in catalyzing cellulose esterification reactions.

As previously stated, the confrication step can be conducted in the presence or absence of organic acid anhydride reactant 6 employing only the aforementioned feed system 2 and esterification chemicals 3, respectively, in forming a confricated organic acid ester of cellulose 7. Thereafter, in a particular embodiment of this invention, organic acid anhydride 6 can be chemically combined with the previously formed confricated cellulose ester product 7 to produce a substantially complete and esterified organic acid ester of cellulose. The amount of anhydride 6 employed, in any case, is dependent for the most part on reaction conditions, the amount of water present, and the degree of substitution desired. However, since the anhydride reactant is quite costly with respect to the other materials employed, a minimum amount should be added in order to maintain the commercial feasibility of the esterification process.

In a further alternative embodiment, varying amounts of organic acid anhydride 6 can be added along with the cellulose feed system 2, to high energy reactor 10. Further amounts of organic acid anhydride 6, if desired, may be also added to secondary reactor 8 for reaction with confricated cellulose ester product 7, as previously described.

As in the case of esterification chemicals 3, the anhydride reactant 6 on reaction in the high energy reactor 10, substantially penetrates, and is uniformly distributed throughout, the confricated cellulosic product. Lower alkyl organic acid anhydride, individually or combinations thereof, such as propionic anhydride, butyric anhydride, and acetic anhydride, are, again, typically employed since higher organic acid anhydride generally reacts too slowly.

The conditions of temperature and/or pressure at which the confrication step is conducted does not require the degree of meticulous regulation present in conventional esterification processes. Therefore, confrication can be carried out at a temperature up to the boiling point of organic acid reagent 4, at atmospheric pressure, and above the boiling point of organic acid reagent 4, at corresponding superatmospheric pressure. For example, if the organic acid reagent employed is acetic acid, under atmospheric conditions, the confrication energy in the high energy reactor 10 can be up to about 118° C. (the boiling point of acetic acid).

In the subject controled esterification process, an organic acid ester of cellulose, which is substituted in a substantially uniformly distributed manner, is efficiently and rapidly produced. The time required to complete the above esterification, as previously stated, is measured from the point at which the cellulose reaction system 2, in the absence or in the presence of an organic acid anhydride, is subjected to confrication in high energy reactor 10. Specifically, the time required to complete the controled esterification, as previously set forth, is at least about 0.5 hour, and preferably in at least about 0.25 hour, and more preferably in at least about 0.1 hour.

EXAMPLE 1

As an illustration of the process of the present invention for forming organic acid esters of cellulose, in an efficient and rapid manner, including the subject controled esterification reaction, the following experiments were conducted.

A. 10.7 pounds of a high alpha, acetate grade, cellulose pulp and 0.7 pound of water were premixed with 20 pounds of acetic acid, and fed into a Bauer 415 refiner where they were confricated for a period of 2 minutes, at a power input of 12 HPD/T. A solution of 20 pounds of acetic acid and 0.3 pound of sulfuric acid were metered, over the course of the above 2 minutes' confrication period, to the center duct or eye of a 24-inch double-disc Bauer 415 high consistency refiner into a working space formed between a pair of rotatable discs. Each of the discs carried a movably mounted, roughened surface, refining plate section. The nominal consistency of the cellulose-containing reaction system formed, measured at the exit of the refiner, was about 19.6%. The discs, in this case, are rotatable in opposite directions, about a fixed, common axis by suitable power means. The roughened surfaces were in relatively high motion with respect to each other and were operated at a predeterined power input level of about 12 HPD/T so that the desired degree of confrication was maintained therein.

To produce the energy required for confrication, the relative movement between the two surfaces will vary depending upon the type of apparatus employed. In general, if the discs operate in opposed directions, the surfaces will operate at a relative tangential velocity of no less than about 1,000 ft/minute, and the rotation will be about a fixed axis to obviate relative gyratory movement which causes balling of the fibers. When one of the surfaces is stationary, however, the relative tangential velocity of the surfaces will preferably be at least 5,000 ft/minute. Where both surfaces are moving in opposite directions, a relative tangential velocity of at least 15,000 ft/minute is preferred. Under all conditions, the velocity between the refiner surfaces should be sufficiently great so as to impart sufficient energy to the fibers to effect confrication and, at the same time, provide sufficient energy to move the fibers through the refiner. The two surfaces between which the pulp is treated should preferably be roughened by providing projections of such character as to engage the high consistency pulp.

Although the average operating pressure imparted by the refiner surfaces on the cellulosic fibers may vary, an average pressure of between 5 to 20 pounds/in$^2$ will be sufficient to produce a pulp of desired physical and chemical properties.

The pulp then is moved rapidly and continuously in a single pass through the work space, in a direction away from the point of introduction, toward the point of discharge, the activated alkali cellulose product being rapidly formed therein.

From the confricated product formed, six 765-gram samples, each containing about 150 grams of cellulose, 600 grams of acetic acid, 5.4 grams of sulfuric acid, and 10.2 grams of water, were added to a cooled solution (at a temperature of about 0°– 5° C.) of 445.5 grams of acetic anhydride, 300 grams of acetic acid, and 5.4 grams of sulfuric acid. The mixtures were stirred and the cellulose quickly went into solution in a time of about 15 minutes. The product formed was cellulose triacetate.

B. The process described in (A) of this example was repeated, except that in addition to the cellulose, water and acetic acid, a solution of 0.48 pound of sulfuric acid and 20 pounds of acetic anhydride was also pumped into the eye of the refiner over the course of the 2-minute confrication period. The consistency in the refiner during this run was about 19.5%. Three samples of 512 grams each were added to cold solutions of 400 grams of acetic acid, 97 grams of acetic anhydride, and 2.4 grams of sulfuric acid. The cellulose triacetate formation reaction began so rapidly that the confricated product was beginning to turn to acetate dope as it exited the refiner, in a period of time of at least 0.1 hour.

The terms and expressions which have been employed in the foregoing abstract, specification, and examples, have been provided herein for purposes of description and not of limitation, and there is no intention in their use of excluding equivalents thereof, it being recognized that the scope of the invention is defined and limited only by the claims which follow.

We claim:

1. A process for forming organic acid esters of cellulose, in an efficient and rapid manner, which includes a controlled esterification reaction comprising confricating cellulose, at high consistency, in the presence of esterification chemicals, to form a confricated cellulose ester product, said confrication step including high energy, frictional interaction of said cellulose and esterification chemicals, respectively, which are maintained in relatively intimate contact one with the other, and furnishing the predominant means for providing penetration of said esterification chemicals for distribution throughout the cellulose, without substantial degradation of the confricated cellulose ester product formed.

2. The process of claim 1, wherein said cellulose is chemicaly combined with an organic acid anhydride reactant, said anhydride substantially penetrating, and being distributed throughout, said cellulose.

3. The process of claim 2, wherein superatmospheric pressure is maintained during said confrication step.

4. The process of claim 3, wherein the temperature is maintained above the boiling point of said organic acid reagent during said confrication step.

5. The process of claim 2, wherein the time required to efficiently and rapidly form said organic acid esters of cellulose is less than about 0.5 hour.

6. The process of claim 5, wherein the formation time is less than about 0.1 hour.

7. The process of claim 2, wherein the organic acid anhydride reactant is acetic anhydride.

8. The process of claim 1, wherein said organic acid anhydride is present during said confrication step, said anhydride reactant substantially penetrating, and being distributed throughout, the cellulose.

9. The process of claim 8, wherein said confricated cellulose product formed during said confrication step is further reacted with an organic acid anhydride reactant.

10. The process of claim 1, wherein said esterification chemicals comprise an organic acid reagent and esterification catalyst.

11. The process of claim 10, wherein the organic acid reagent is acetic acid and the esterification catalyst is sulfuric acid.

12. The process of claim 1, wherein said high consistency confrication step is conducted in a disc refiner.

13. The process of claim 12, wherein said high consistency is from about 15 to about 35% based on the dry weight of fibers in the feed.

14. The process of claim 12, wherein the amount of energy imparted to the high consistency cellulose sufficient to provide confrication is from about 8 HPD/T pulp up to an upper energy level of about 40 HPD/T.

15. The process of claim 14, wherein the amount of energy is from about 15 HPD/T to about 25 HPD/T.

16. The process of claim 1, wherein the organic acid ester of cellulose formed is cellulose triacetate.

17. The process of claim 12, wherein the organic acid ester of cellulose formed is cellulose triacetate.

18. A process for rapidly forming organic acid esters of cellulose which comprises the steps of:
  a. introducing cellulose, at high consistency, and esterification chemicals into an area formed within a high energy reactor, said area including means for confricating said high-consustency cellulose in the presence of said esterification chemicals; and
  b. confricating said cellulose and esterification chemicals, respectively, said configuration step including the high energy, frictional interaction of said cellulose and esterification chemicals which are maintained at relatively intimate contact one with the other, said resultant confricated product being characterized in that said esterification chemicals have substantially penetrated, and are uniformly distributed throughout, said cellulose.

19. The process of claim 18, wherein said confricating means comprises a pair of opposed surfaces forming a work space therebetween, said opposed surfaces being capable of imparting the requisite amount of confrication energy to said cellulose passing within the confines of said work space.

20. The process of claim 19, wherein said high consistency confrication step is conducted in a disc refiner.

21. The process of claim 20, wherein said high consistency is from about 15 to about 35% by weight based on the dry weight of fibers in the feed.

22. The process of claim 20, wherein the amount of energy imparted to the high consistency cellulose sufficient to provide confrication is from about 8 HPD/T up to an upper energy level of about 40 HPD/T.

23. The process of claim 22, wherein the amount of energy is from about 15 HPD/T to about 25 HPD/T.

* * * * *

UNITED STATES PATENT OFFICE
CERTIFICATE OF CORRECTION

Patent No. 4,016,353                Dated   April 5, 1977

Inventor(s) David W. Goheen; Michael D. Fahey; and Harvey L. Claussen

It is certified that error appears in the above-identified patent and that said Letters Patent are hereby corrected as shown below:

In Column 8, line 59, "activated alkali cellulose" should read -- cellulose acetate --.

In column 9, claim 2, line 2, change the spelling of "chemicaly" to - - - chemically - - -.

In column 10, claim 18, line 6, change the spelling of "consustency" to - - - consistency - - -.

In column 10, claim 18, line 9, delete the word "configuration", and insert - - - confrication - - -.

Signed and Sealed this ninth Day of August 1977

[SEAL]

Attest:

RUTH C. MASON
Attesting Officer

C. MARSHALL DANN
Commissioner of Patents and Trademarks